US005679725A

United States Patent [19]
Fisher

[11] Patent Number: 5,679,725
[45] Date of Patent: Oct. 21, 1997

[54] METHOD OF MAKING A FOUNDATION POLYDIORGANOSILOXANE-SILICA MIXTURE USING A HYDROLYZABLE POLYDIORGANOSILOXANE SURFACE MODIFYING AGENT, THE RESULTING MIXTURE AND A ROOM TEMPERATURE CURING SEALANT MADE FROM THE FOUNDATION MIXTURE

[75] Inventor: Mark David Fisher, Midland, Mich.

[73] Assignee: Dow Corning Corporation, Midland, Mich.

[21] Appl. No.: 564,755

[22] Filed: Nov. 29, 1995

[51] Int. Cl.$^6$ .............. C08K 9/06; C08K 3/00; B05D 7/00
[52] U.S. Cl. .......... 523/212; 524/588; 524/847; 524/860; 524/862; 524/863; 427/213
[58] Field of Search ................. 524/588, 847, 524/860, 863, 862

[56] References Cited

U.S. PATENT DOCUMENTS

| | | | |
|---|---|---|---|
| 2,890,188 | 6/1959 | Konkle et al. | 260/29.1 |
| 5,153,238 | 10/1992 | Bilgrien et al. | 523/21 |
| 5,391,594 | 2/1995 | Romenesko et al. | 523/212 |
| 5,412,014 | 5/1995 | Romenesko | 524/416 |

FOREIGN PATENT DOCUMENTS 2284609  6/1995  United Kingdom.

*Primary Examiner*—Karen A. Dean
*Attorney, Agent, or Firm*—Roger H. Borrousch

[57] ABSTRACT

A process of making a polydiorganosiloxane-silica foundation mixture from a free-flowing, powdered, surface-modified, reinforcing silica-polydiorganosiloxane concentrate used to make, for example, RTV silicone sealant compositions which have non-sag properties. The foundation mixtures are made by combining, mixing, and heating a reinforcing silica filler and a surface modifying agent to a temperature of >90° C. to <180° C. using 0.1 to 0.5 parts by weight of the surface modifying agent per one part by weight of the silica. Polydiorganosiloxane is added gradually to the resulting fluidized filler over a time period of less than 10 minutes to obtain the free flowing powdered reinforcing silica-polydiorganosiloxane concentrate. The foundation mixture is obtained by massing the concentrate and adding more polydiorganosiloxane to obtain a mixture which has from 8 to 20 weight percent silica filler. RTV silicone sealant compositions can be obtain in 10 to 15 minutes from the start of making the surface modified silica filler to the complete sealant composition.

26 Claims, No Drawings

METHOD OF MAKING A FOUNDATION POLYDIORGANOSILOXANE-SILICA MIXTURE USING A HYDROLYZABLE POLYDIORGANOSILOXANE SURFACE MODIFYING AGENT, THE RESULTING MIXTURE AND A ROOM TEMPERATURE CURING SEALANT MADE FROM THE FOUNDATION MIXTURE

BACKGROUND OF THE INVENTION

1. Field of the Invention

This invention relates to a process of preparing a foundation polydiorganosiloxane-silica mixture and a non-slump room temperature vulcanizable (RTV) silicone sealant.

2. Background Information

RTV silicone sealants are used for a variety of adhesive and weatherproofing applications. Many of these applications require a material to have the consistency that allows it to be installed in the uncured state in a vertical configuration while maintaining its shape until cure has occurred. A sealant which maintains its shape in a vertical configuration until cure has occurred is said to have non-slump or non-sag properties. If a sealant sags or flows from its initial configuration, the desired weatherproofing or adhesive property will not be obtained. A typical silicone sealant formulation comprises a silicone polymer, a curing agent, such as a crosslinker or a combination of a crosslinker and a curing catalyst, and a filler, such as a reinforcing silica filler and an extending filler. The reinforcing silica, such as fumed silica filler, is used to provide reinforcement to the polymeric network, to provide a thixotropic property to the uncured composition, and to provide higher tensile strength and tear strength to the cured product. It is generally known that the silica must be treated in order to produce a non-sag sealant composition. Without treatment, a slumpy or saggy sealant composition can result.

One way to prepare non-sag silicone sealants is to first react a crosslinker with a silicon-bonded hydroxyl endblocking group of a polydiorganosiloxane and then follow with the addition of silica filler. Using this approach, crosslinker is used in an amount sufficient to react with the hydroxyl groups of the polydiorganosiloxane and the hydroxyl groups on the silica. This process provides the desired non-sag sealant composition, but this means the process is limited to one type of cure chemistry, such as to a sealant composition with organotriacetoxysilane crosslinker or a sealant composition with organotrioximosilane crosslinker, during the manufacturing operations. However, if a foundation mixture could be prepared without the curing agent, i.e. crosslinker and curing catalyst, and if this foundation mixture could be used as the basis for the preparation of a variety of sealant compositions having different curing agent chemistries, the advantages are many. For example, one type of starting mixture means that only minor changes on continuous mixing equipment are required, such that change over from one sealant composition or another type can be readily done. The number of ingredients in inventory can be reduced and equipment can become available for other manufacturing processes. Also, the flexibility of the kinds of products made from one starting material is an advantage for meeting customer needs in a hurry.

SUMMARY OF THE INVENTION

In order to make a foundation mixture viable for the manufacture of sealant compositions, it needs to be stable over the time period from immediately after its preparation to the time when the foundation mixture is formulated into an RTV silicone sealant composition. By being stable for the purposes of this invention, it means that the foundation mixture can be used to formulate a sealant composition and the resulting sealant composition will have a maximum slump of 0.51 cm (0.20 inch) as defined by ASTM D 2202, preferably less.

It is desirable to prepare a non-sag, one-package, RTV, silicone sealant composition from a foundation mixture which avoids during storage the well-known silica-polymer interaction problems, known as crepe hardening or structure formation. Generally, it is believed that the use of pretreated reinforcing silica fillers eliminates these silica-polymer interactions and provides a stable composition comprising polydiorganosiloxane and reinforcing silica filler. However, the present inventors have found that a stable foundation mixture of silica filler and polydiorganosiloxane wherein the siloxane polymer has a viscosity at 25° C. of 400 Pa.s or less, is not obtained with ordinary pretreated reinforcing silica fillers. In fact, commercially available pretreated silica fillers, such as TS-610 (R) and TS-530(R) available from Cabot Corporation, Tuscola, Ill., required additional treatment to produce a foundation mixture with long term stability such that an acceptable sealant composition could be produced after times as long as one year. TS-610 is a dimethyldichlorosilane treated fumed silica with a surface area of about 120 +/−20 $m^2/g$ and TS-530 is a hexamethyldisilazane treated fumed silica with a surface area of about 200 +/−40 $m^2/g$.

One embodiment of this invention relates to a process for making a polydiorganosiloxane-silica foundation mixture from a free-flowing, powdered, surface-modified, reinforcing silica-polydiorganosiloxane concentrate comprising (i) combining, while mixing and heating, reinforcing silica filler having a surface area of 90 to 500 $m^2/g$ and having a median aggregate-agglomerate particle size less than 600 micrometers and a surface modifying agent of the formula $R'O(R_2SiO)_xR'$ wherein R is methyl, ethyl, vinyl, 3,3,3-trifluoropropyl, or phenyl; each R' is selected from the group consisting of methyl radical, ethyl radical, and acetyl radical; and x is a value of from 2 to 12 inclusive making a filler mixture where there is 0.1 to 0.5 part by weight of surface modifying agent per one part by weight of silica filler, (ii) mixing the filler mixture at a temperature in the range of from >90° C. to <180° C. and maintaining the filler mixture in a fluidized powder state until the surface modifying agent is dispersed throughout the silica filler and the median aggregate-agglomerate particle size of the filler mixture is less than the median aggregate-agglomerate particle size of the silica filler, this mixing process does not exceed 30 minutes in duration, and removing volatiles from the filler mixture during the mixing process, (iii) adding gradually, with mixing, a polydiorganosiloxane having a viscosity measured at 25° C. of from 0.1 to 400 Pa.s to the modified silica filler obtained from step (ii) and completing the addition in <10 minutes after the modified silica filler is obtained at the conclusion of step (ii), where the amount of polydiorganosiloxane is added to provide from 25 to 40 weight percent silica filler based on the total weight of the polydiorganosiloxane and the modified silica filler, thereafter (iv) mixing until a uniform free flowing powder of a reinforcing silica-polydiorganosiloxane concentrate is obtained where the total mixing time of steps of (iii) and (iv) does not exceed 10 minutes, thereafter (v) massing the uniform free-flowing silica-polydiorganosiloxane concentrate obtained from step (iv) until a paste consistency mixture is obtained, and (vi) admixing gradually more polydiorganosiloxane making a uniform foundation mixture having a higher concentration of polydiorganosiloxane than the free-flowing silica-polydiorganosiloxane concentrate and the silica filler content of the uniform foundation mixture is from 8 to 20 weight percent based on the total weight of the foundation mixture.

Another embodiment of this invention relates to a process for making polydiorganosiloxane-silica foundation mixture from a free-flowing, powdered, surface-modified, reinforcing silica-polydiorganosiloxane concentrate comprising (a) heating reinforcing silica filler having a surface area of 90 to 500 m$^2$/g and having a median aggregate-agglomerate particle size less than 600 micrometers to a temperature in a range of from >90° C. to <180° C., removing volatiles from the silica filler, thereafter (b) adding to the heated reinforcing silica filler while mixing, a surface modifying agent of the formula R'O(R$_2$SiO)$_x$R' wherein R is methyl, ethyl, vinyl, 3,3,3-trifluoropropyl, or phenyl; each R' is selected from the group consisting of methyl radical, ethyl radical, and acetyl radical, and x is a value of from 2 to 12 inclusive, making a filler mixture where there is 0.1 to 0.5 part by weight of surface modifying agent per one part by weight of silica filler, and (c) heating and mixing the filler mixture at a temperature in the range of from >90° C. to <180° C. and maintaining the filler mixture in a fluidized state until the surface modifying agent is dispersed throughout the silica filler and the median aggregate-agglomerate particle size of the filler mixture is less than the median aggregate-agglomerate particle size of the silica filler, the mixing process does not exceed 30 minutes in duration, and removing volatiles from the filler mixture during the mixing process where a modified silica filler is obtained, (d) adding gradually, with mixing, a polydiorganosiloxane having a viscosity measured at 25° C. of from 0.1 to 400 Pa.s to the modified silica filler of step (c) and completing the addition in <10 minutes after the modified silica filler is obtained at the conclusion of step (c), where the amount of polydiorganosiloxane is added to provide from 25 to 40 weight percent silica filler based on the total weight of the polydiorganosiloxane and the modified silica filler, thereafter (e) mixing until a uniform, free-flowing, powdered, surface-modified, reinforcing silica-polydiorganosiloxane concentrate is obtained where the total mixing time of steps (d) and (e) does not exceed 10 minutes, (f) massing the uniform free-flowing silica-polydiorganosiloxane concentrate until a paste consistency mixture is obtained, and thereafter (g) admixing gradually more polydiorganosiloxane making a uniform foundation mixture having a higher concentration of polydiorganosiloxane than the uniform free-flowing silica-polydiorganosiloxane concentrate obtained in step (e) and the silica filler content of the foundation mixture is from 8 to 20 weight percent based on the total weight of the foundation mixture.

DETAILED DESCRIPTION OF THE PREFERRED EMBODIMENTS

The process of this invention is to prepare a foundation mixture of polydiorganosiloxane and reinforcing silica which can be used to make one-package, RTV, silicone sealant compositions which are non-sag. In the process of combining reinforcing silica filler with silanol terminated polydiorganosiloxane, non-sag silicone sealants can be made from the foundation mixture, if the reinforcing silica filler is combined with a short chain polydiorganosiloxane surface modifying agent using certain process steps to modify the silica filler surface.

The short chain polydiorganosiloxane having silicon-bonded groups for the purposes of this invention is defined as a surface modifying agent of the formula R'O(R$_2$SiO)$_x$R' wherein R is methyl, ethyl, vinyl, 3,3,3-trifluoropropyl, or phenyl; each R' is methyl radical, ethyl radical, or acetyl radical; and x is a value of from 2 to 12 inclusive. The preferred surface modifying agents are those which are mixtures of molecules where at least 50 percent of the molecules have values for x of no more than 6. Surface modifying agents which have values of x of less than 6 provide foundation mixtures with longer stable storage times than those surface modifying agents having a value of x greater than 6. Particularly useful surface modifying agents are those which are mixtures of molecules where x has a value of about 4, and R is methyl, and R' is methyl or acetyl.

The reinforcing silica fillers are those which have a surface area of 90 to 500 m$^2$/g and have a median aggregate-agglomerate particle size of less than 600 micrometers. The aggregate-agglomerate particle sizes can be determined by a Coulter Particle Size Analyzer Model No. LS130, Hialeah, Fla. Many of this kind of silica filler are available commercially today and are well known, such as fumed silica and precipitated silica. The silica fillers can be either untreated or treated. Treated silica fillers are well known in the art and as stated previously many are available commercially, such as TS-610 and TS-530. The silica filler treatments include triorganosiloxy surface treatment from reaction with triorganochlorosilane, hexaorganodisiloxane hexaorganodisilazane; other silane treatments such as dimethyldichlorosilane,; and from various polydiorganosiloxanes which are endblocked with silicon-bonded hydroxyl groups or silicon-bonded alkoxy groups.

The surface modifying agent and the silica filler are combined while mixing and heating, step (i). They are combined such that there is from 0.1 to 0.5 part by weight of surface modifying agent per part by weight of silica filler. The amount of surface modifying agent used in making the modified silica filler which provides the most stable foundation mixtures, i.e. have the longest storage times and still produce a non-sag, one-package, RTV, silicone sealant composition, are those which have more than 0.25 part by weight of surface modifying agent per part of silica filler. The storage stability of the foundation mixture and its ability to be formulated into non-sag sealant compositions is related to the chain length of the surface modifying agent. In both the foundation mixture and the sealant composition where everything is substantially equal except for the surface modifying agent, the higher the surface modifying agent chain length, such as x being 12, the more surface modifying agent is required to obtain equivalent storage stability for the foundation mixture and equivalent sealant composition slump, compared to that which is obtainable from using surface modifying agents with shorter chain lengths. Conversely, the shorter the surface modifying agent chain length, such as x being 2 to 4, the lower the concentration of surface modifying agent required to obtain equivalent storage stability for the foundation mixture and equivalent sealant composition slump.

The mixture of surface modifying agent and silica filler are fluidized (agitated) at a temperature of from >90° C. to <180° C., preferably >150° C. to 180° C. and the resulting filler mixture is maintained in the fluidized powder state until the surface modifying agent is dispersed throughout the silica filler and the median aggregate-agglomerate particle size of the filler mixture is less than the median aggregate-agglomerate particle size of the starting silica filler step (ii). The filler mixture becomes more flowable and may be called "more fluffy" than the starting silica filler at this point of the process. At the "more fluffy" point, a modified silica filler is obtained. The density of the filler mixture may be reduced to 2 or 3 pounds per cubic foot (32–48 kg/m$^3$) at this point of the process. This fluffy state is an indication that the surface modifying agent is dispersed throughout the silica filler. The mixing and heating step to obtain the modified silica filler should not exceed 30 minutes, and preferably it is 5 minute or less, and more preferably less than one minute. During this mixing and heating step the volatiles are removed. This can be accomplished by means of a partial vacuum, by a nitrogen gas sweep or purge, or using a combination of both partial vacuum and nitrogen gas sweep. When this mixing and heating step goes beyond the 30 minutes duration, no advantages are observed. The rate of dispersion of the surface modifying agent with the silica filler is increased by the addition of small amounts of hexamethyldisilazane, such as less than 0.1 weight percent based on the weight of the surface modifying agent.

The heating and mixing can be accomplished by any mixing equipment which provides the necessary fluidization and agitation to maintain the surface modifying agent and silica filler in a constant fluid state, heat as required, and removal of the volatiles. One such mixer is a Littleford Plowshear mixer/granulator, from Littleford Bros., Inc, Florence, Ky. This mixer provides a hurling and whirling action which are imparted by plow shaped mixing tools. The plow blades are coupled with high speed blending chopper blades which can rotate at 3600 rpm which introduce high impact and shear. This particular equipment provides the required mixing for the preparation of the modified silica filler along with the ability to heat and remove volatiles. There is a window of mixing and heating time for which the resulting modified silica filler has the excellent properties to provide storage stable products in which it is used, such as the foundation mixture and the one-package RTV silicone sealant composition which has non-sag properties. In this window of mixing time, there is a relationship between the amount of surface modifying agent and the temperature to provide the excellent properties. At temperatures in the high part of the described range, smaller amounts of surface modifying agent can be used to obtain the excellent properties whereas at temperatures in the lower part of the range, larger amounts of surface modifying agent are needed to achieve the same excellent results. By storage stable it is meant that the products maintain their properties, within the rheology property profile as defined herein, throughout the time period beginning at the time when they are made to the time when they are finally used to make an RTV silicone sealant composition and to the time when the RTV is cured. It is desirable to retain the uncured properties, such as rheology and non-sag properties of the RTV silicone sealant composition, as well as, the properties of the cured sealant, such as tensile strength, elongation, modulus, and tear strength.

A preferred process for making the modified silica filler is to heat the reinforcing silica filler to a temperature in the range of from >90° C. to <180° C. and remove volatiles from the silica filler, such as water which is often associated with silica fillers, step (a). The volatiles can be removed as described previously such as by a partial vacuum, by a nitrogen gas sweep, or by a combination of these two. The time is usually rather short for this step in view of the temperature used and with a gas sweep, the volatiles are readily removed in times of one minute or less. Preferably the temperature is between >150° C. and <180° C. and the time is about one minute.

After the volatiles are removed, the heating and mixing is continued and the surface modifying agent is added, step (b), as defined above and in the amounts as stated. The duration of the heating and additional mixing is as described above. The filler mixture is heated at a temperature in the range of >90° C. to <180° C., preferably >150° C. to <180° C. maintaining it in a fluidized state until the surface modifying agent is dispersed throughout the silica filler and the particle sizes are observed to change as described above, step (c). This mixing process does not exceed more than 30 minutes in duration and the volatiles are removed as discussed previously to obtain a modified silica filler, preferably this mixing process is from 30 seconds to 60 seconds in duration. Steps (d), (e), (f), and (g) of the preferred process are the same as the steps (iii), (iv), (v), and (vi) as found in the following description.

After the modified silica filler is prepared, a polydiorganosiloxane having a viscosity measured at 25° C. of from 0.1 to 400 Pa.s is gradually added to the modified silica filler, such that, the addition is completed in less than 10 minutes, preferably less than 5 minutes (step iii). A sufficient amount of polydiorganosiloxane is added to provide a uniform free flowing powder concentrate having from 25 to 40 weight percent silica filler based on the total weight of the concentrate. The modified silica filler and polydiorganosiloxane are mixed until a uniform free flowing powder concentrate of polydiorganosiloxane and silica filler is obtained (step iv). The total mixing time in steps (iii) and (iv) should not exceed 10 minutes to obtain the uniform, free-flowing, powdered, polydiorganosiloxane-silica filler concentrate. Over mixing by exceeding the 10 minute mixing time for steps (iii) and (iv), can cause the powder to agglomerate creating lumps and other inconsistencies such that the powdered concentrate is not as free flowing as needed resulting in more difficult processing conditions when making sealant compositions.

In step (iii), the polydiorganosiloxane can be added incrementally to the modified silica filler obtained from step (ii). There does not seem to be any significant property variation to adding the polydiorganosiloxane continuously at a gradual pace or incrementally, except that adding it continuously at a gradual pace results in easier processing to obtain the powdered concentrate.

The polydiorganosiloxane can be selected from those having silicon-bonded hydroxyl groups at both ends or a mixture of polydiorganosiloxanes wherein more than 50 percent of the polymer molecules have silicon-bonded hydroxyl groups at both ends and the remaining polymer molecules contain silicon-bonded hydroxyl groups on one end and triorganosiloxy units as the endblocker on the other end. Those polydiorganosiloxanes which are mixtures of polydiorganosiloxanes with silicon-bonded hydroxyl groups on both ends and polydiorganosiloxanes with silicon-bonded hydroxyl groups on one end and triorganosiloxy units at the other end are known in the art as shown by Dupree in U.S. Pat. No. 3,274,145, issued Sep. 20, 1966, which is hereby incorporated by reference to show polydiorganosiloxane mixtures having both silicon-bonded hydroxyl groups and triorganosiloxy groups. For this invention, when polymers having both silicon-bonded hydroxyl groups and triorganosiloxy groups are used in step (iii) to make the powdered concentrate, those which are preferred have at least 80 percent of the ends terminated with silicon-bonded hydroxyl groups. The polydiorganosiloxanes preferably have a viscosity at 25° C. of from 5 to 100 Pa.s. The polydiorganosiloxanes comprise diorganosiloxane units of the formula $R''_2SiO$ where $R''$ is a monovalent hydrocarbon radical or a halogenated monovalent hydrocarbon radical which are illustrated by alkyl radicals including methyl, ethyl, propyl, isopropyl, butyl, pentyl, hexyl, and the like; alkenyl radicals, such as vinyl, allyl, hexenyl, and the like; cycloalkyl, such as cyclopentyl and cyclohexyl; aryl such as phenyl and tolyl; and haloalkyl such as chloropropyl, trifluoropropyl, (2-perfluoropropyl)ethyl, and the like. The preferred polydiorganosiloxanes are those which have mostly methyl with minor amounts of vinyl and phenyl radicals. Although these polymers are defined as polydiorganosiloxanes, small amounts of other units such as monoorganosilsesquioxane units, or $SiO_2$ units may be present as frequently found in the polydiorganosiloxane as a result of the manufacturing methods used. By small amounts, it is meant that there are less than about 5 mole percent of such units, preferably less than 2 mole percent.

Other kinds of polydiorganosiloxanes can be used such as those which are endblocked with hydrolyzable containing silicon units, such as trimethoxysiloxy units, triethoxysiloxy units, methyldimethoxysiloxy units, and methyldiethoxysiloxy units, as described by Brown et al in U.S. Pat. No. RE 29,760, reissued Sep. 12, 1978, and which is hereby incorporated by reference to show such polyalkoxy terminated polydiorganosiloxanes and their method of preparation. These polyalkoxy terminated polydiorganosiloxanes are illustrated by the formula

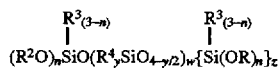

in which $R^2$ is an aliphatic hydrocarbon radical or halogenated aliphatic hydrocarbon radical of from 1 to 8 inclusive carbon atoms, $R^3$ and $R^4$ are each selected from the group consisting of monovalent hydrocarbon radicals and monovalent halohydrocarbon radicals all of from 1 to 18 inclusive carbon atoms, n has an average value of from 2 to 3 inclusive, y has an average value of from 1.99 to 2 inclusive, z has an average value of from 1 to 1.01, the sum of y and z is 3, and w has a value such that the viscosity at 25° C. is from 0.1 to 400 Pa.s.

Some other polyalkoxy terminated polydiorganosiloxanes are those which contain divalent hydrocarbon linkages at the terminal portion of the polydiorganosiloxane, such as those described by Weyenberg in U.S. Pat. No. 3,175,993, issued Mar. 30, 1965, and by Klosowski et al in U.S. Pat. No. 4,871,827, issued Oct. 3, 1989, both of which are hereby incorporated by reference to show such polydiorganosiloxanes and methods of their preparation. These polydiorganosiloxanes have a formula

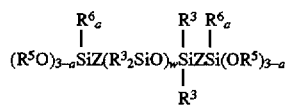

in which each $R^5$ is methyl, ethyl, propyl, or butyl, each $R^6$ is free of aliphatic unsaturation and is a monovalent hydrocarbon or monovalent halogenated hydrocarbon all of 1 to 18 inclusive carbon atoms, $R^3$ and w are defined above, Z is a divalent hydrocarbon radical or combination of divalent hydrocarbon radicals and siloxane radicals, and a is 0 or 1. Polydiorganosiloxanes which have other silicon bonded hydrolyzable groups at their terminals may also be useful, for example acetoxy groups and ketoximo groups.

After the powdered concentrate in step (iv) is obtained, it is then massed until a paste consistency mixture is obtained (step v). This massing process is easily accomplished when the amount of silica filler in the concentrate is in the 25–30 weight percent range especially when the viscosity of the polydiorganosiloxane is less than 50 Pa.s when measured at 25° C. The massing process requires equipment with high shear when the amount of silica filler is at the higher concentration, for example, 35–40 weight percent range especially when the viscosity of the polydiorganosiloxane is greater than 50 Pa.s when measured at 25° C.

More polydiorganosiloxane is gradually admixed with the massed powdered concentrate to provide a uniform foundation mixture which contains from 8 to 20 weight percent silica filler based on the total weight of the foundation mixture, preferably the foundation mixture contains from 8 to 15 weight percent silica filler. As the concentration of silica filler in the foundation mixture increases above 15 weight percent, the processing becomes more difficult as the viscosity increases and it requires greater energy to produce sealant compositions as well as making uniform foundation mixture initially. The concentration of the polydiorganosiloxane in the foundation mixture is higher than in the free-flowing silica-polydiorganosiloxane concentrate. The polydiorganosiloxane is preferably added and mixed under conditions which keeps the formation of voids at a minimum. Keeping the formation of voids to a minimum results in a quicker preparation of the uniform foundation mixture. When a paste consistency material is mixed with a fluid material such as the polydiorganosiloxane, the incorporation of voids from a gas atmosphere is very likely to occur and extra care is required to keep the formation of such voids at a minimum. Other kinds of polydiorganosiloxanes can be used such as those which are endblocked with hydrolyzable containing silicon units, like the polyalkoxy terminated polydiorganosiloxanes described herein and further described by Brown et al, Weyenberg, and Klosowski et al.

The preferred foundation mixtures have a "plateau stress" value of >700 dynes/cm$^2$, preferably >1,000 dynes/cm$^2$. This plateau stress value is a measure of polymer/filler interaction. After initial preparation plus any storage aging, a foundation mixture is considered stable when the plateau stress value is >700 dynes/cm$^2$, where this would be the point at which a crosslinker and a catalyst, if used, would be added to the foundation mixture. Sealant compositions made from foundation mixtures which have a plateau stress >1,000 dynes/cm$^2$, produce a composition with <0.5 cm (<0.2 inch) flow when measured by ASTM D 2202. The preferred foundation mixtures also have a shear-thinned viscosity of no more than 1,000 Pa.s at a shear stress of 50,000 dynes/cm$^2$, and preferably no more than 600 Pa.s where the viscosity is measured at 25° C. Therefore, the preferred foundation mixtures are those having a plateau stress of >700 dynes/cm$^2$ and a shear-thinned viscosity of no more than 1,000 Pa.s. Even more preferred foundation mixtures are those having a plateau stress of >1,000 dynes/cm$^2$ and a shear-thinned viscosity of no more than 600 Pa.s.

Plateau stress values were determined, for the purposes of this application, on a Carri-Med Rheometer (Model CSL 500) using cone and plate. The flow method was used to determine plateau stress values. The cone was a 0.5 degree, 2 cm diameter cone and the gap between the cone and the plate during testing was 13 microns (the test specimen thickness). Foundation mixture was gently removed from the storage container. A few grams were placed on the temperature controlled bottom plate (at 25° C.) before the plate was raised into position with the top cone to provide a specimen thickness of 13 microns. The test specimen was allowed to equilibrate for 1 to 5 minutes to reach the 25° C. condition. An initial stress of 100 dynes/cm$^2$ was applied to the test specimen. After equilibration, the shear stress was increased until the shear stress reached 50,000 dynes/cm$^2$ over a 5 minute period in a logarithmic stress sweep mode. This was called the up curve. Once 50,000 dynes/cm$^2$ was reached, this stress was held for 30 seconds. The shear stress was reduced to 100 dynes/cm$^2$ over a 5 minute period. This was called the down curve. The plateau stress value in dynes/cm$^2$ was the shear stress at the shear rate of 0.023 sec$^{-1}$ on the down curve. The shear-thinned viscosity was that viscosity measured when the shear stress was at 50,000 dynes/cm$^2$.

The resulting foundation mixtures are non-sag and can be used to make other silicone compositions which are non-sag, especially one-package, RTV, silicone sealant compositions. Such silicone sealant compositions can be prepared by adding a moisture hydrolyzable crosslinking silicone compound as a curing agent comprising a crosslinker or a crosslinker and a curing catalyst. The particular crosslinker can have an effect on the non-sag property of the final RTV silicone sealant composition. Curing catalysts are used, as required, to provide the utility of cure for the one-package, RTV, silicone sealant compositions made using the foundation mixture.

The crosslinker is a silicon compound containing silicon-bonded hydrolyzable groups, preferably silanes. The silicon-bonded hydrolyzable group is exemplified by acyloxy groups such as acetoxy, octanoyloxy, and benzoyloxy; ketoximo groups such as the dimethyl ketoximo group, the methylethyl ketoximo group, and the diethyl ketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group. The crosslinkers can have three or more silicon-bonded hydrolyzable groups per molecule. When the crosslinker is a silane and when the silane has three silicon-bonded hydrolyzable groups per molecule, the fourth groups is a non-hydrolyzable silicon-bonded organic group. The silicon-bonded organic groups are exemplified by alkyl groups such as methyl, ethyl, propyl, and butyl; cycloalkyl groups such as cyclopentyl and cyclohexyl; alkenyl groups such as vinyl and allyl; aryl groups such as phenyl, and tolyl; aralkyl groups such as 2-phenylethyl; and groups obtained by replacing all or part of the hydrogen in the preceding organic groups with halogen. The preferred silicon-bonded organic groups are preferably methyl.

The crosslinker can be a silane or siloxane, and in the case of siloxanes the molecular structure can be straight chain, branched, or cyclic. The silicon-bonded hydrolyzable groups are exemplified by acyloxy groups such as acetoxy, octanoyloxy, and benzoyloxy; ketoximo groups such as the dimethylketoximo group, the methylethylketoximo group, and the diethylketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group.

The silanes and siloxanes are exemplified by methyltrimethoxysilane, methyltriethoxysilane, vinyltrimethoxysilane, methylphenyldimethoxysilane, 3,3,3-trifluoropropyltrimethoxysilane, methyltriacetoxysilane, vinyltriacetoxysilane, phenyltripropionoxysilane, ethyltris(N,N-diethylamino)silane, vinyltris(N-methyl-N-cyclohexylamino)silane, dimethylbis(N,N-dibutylamino)silane, methyltris(N-methylacetamido)silane, methylvinylbis(N-ethylacetamido)-silane, vinyltris(N-ethylacetamido)silane, methyltris(N,N-diethylaminoxy)silane, phenyltris(N,N-diethylaminoxy)silane, methyltris(methylethylketoximo)silane, vinyltris(methylethylketoximo)silane, 3,3,3-trifluoropropyltris(methylethylketoximo)silane, methyltris(isopropenoxy)silane, vinyltris(isopropenoxy)silane, ethylpolysilicate, n-propylorthosilicate, dimethyltetraacetoxydisiloxane, pentamethyltris(N,N-diethylaminoxy)cyclotetrasiloxane, hexamethylbis(N,N-diethylaminoxy)cyclotetrasiloxane and mixtures thereof.

Some of the crosslinkers can be triketoximosilanes and tetraketoximosilane, triacetoxysilanes and other triacyloxysilanes, trialkoxysilanes and tetraalkoxysilanes, silanes which contain mixtures of ketoximo and alkoxy groups wherein various silanes having from 0 to 4 ketoximo groups per molecule and from 0 to 4 alkoxy groups per molecule wherein the total combined number of alkoxy and ketoximo groups per molecule are three or four. Silanes having both silicon-bonded ketoximo groups and alkoxy groups in the same molecule are known from Klosowski et al in U.S. Pat. No. 4,657,967, issued Apr. 14, 1987, and from Haugsby et al in U.S. Pat. No. 4,973,623, issued Nov. 27, 1990. Both Klosowski et al and Haugsby et al are hereby incorporated by reference to show the silanes and mixtures of silanes which have both ketoximo groups and alkoxy groups on the same molecule. A tribenzamidosilane crosslinker is an example of another crosslinker which can be used in making one-package, RTV, silicone sealant compositions of this invention. These are illustrations of crosslinker silanes which can be used to make RTV silicone sealant compositions which are non-sag.

The curing catalysts for a particular RTV silicone sealant composition depends upon the speed of cure required. Most of the RTV silicone sealant compositions which contain oximosilanes or acetoxysilanes use a tin catalyst for curing, especially diorganotin dicarboxylate compounds such as dibutyltin dilaurate, dibutyltin diacetate, dimethyltin bis-neodecanoate, and the like whereas for the alkoxysilane crosslinker containing RTV silicone sealant compositions the most preferred curing catalyst is a titanium catalyst such as tetrabutyltitanate, tetraisopropyltitanate, diisopropyl bis-(acetylacetonyl) titanate, diisopropyl bis-(ethylacetoacetonyl) titanate, and the like. Such crosslinkers and curing catalysts are well known to silicone sealant artisans and are well known in the silicone sealant art. A typical one-package, RTV, silicone sealant is therefore made according to the present invention from the foundation mixture, crosslinker, curing catalyst, and may contain other kinds of ingredients which are known to be used in silicone sealants, such as extending fillers, pigments, fungicides, antioxidants, UV absorbers, and other additives.

The RTV silicone sealant compositions of this invention can be made from a foundation mixture which is non-sag. Storage times can be lengthened if the foundation mixture is kept cool, i.e. below 15° C. If, however, a conventional treated silica filler were used to make a foundation mixture, a one-package, RTV, silicone sealant composition prepared from such a foundation mixture would not result in a non-sag product. Commercially available pretreated silicas, such as TS-610 and TS-530, can be used to make non-sag silicone sealant compositions, if surface modifying agent is also used and the processes defined by this invention are used. In addition to obtaining non-sag one-package RTV silicone sealant compositions from the foundation mixture, the resulting sealant compositions have better clarity and better adhesion to plastics. An advantage of making non-sag silicone sealant composition from the foundation mixture of this invention is the ability to change from one cure chemistry, such as condensation reaction of silicon-bonded acetoxy functionality, to another cure chemistry, such as condensation reaction of silicon-bonded ketoximo functionality. Changing cure chemisties often in the past created large amounts of waste and long non-productive time periods, however, with the processes of this invention the change over from one cure chemistry to another is fast and amount of waste is small. The flexibility of being able to change quickly and without loss of material and time is a great advantage. A significant feature of the process of this invention is the remarkably short time from the start of making the modified silica filler to the finished one-package RTV silicone sealant composition which can take less than 15 minutes total time. This is a substantial reduction in time over conventional manufacturing time for silicone sealants wherein the silica modification is included in the process time calculations.

The following examples are presented for illustrative purposes and should not be construed as limiting the invention which is properly delineated in the claims. In the following examples, "part" or "parts" are by weight, viscosities are as measured at 25° C. unless otherwise stated, Me is methyl radical,

EXAMPLE 1

A foundation mixture was prepared by mixing at room temperature 0.26 part of an alpha, omega-diacetoxy (octamethyltetrasiloxane) as the surface modifying agent per 1 part of a reinforcing silica filler having a BET surface area of 200 m$^2$/g. After the surface modifying agent and silica filler were mixed, the mixture was heat to 95° C. for 30 minutes to obtain a surface modified silica filler. Enough of a polydimethylsiloxane having a viscosity of 16 Pa.s and having 85% of the endgroups being hydroxyl and 15% of the endgroups being trimethylsiloxy units (referred to hereinafter as Polymer A and was prepared as described by Dupree) was mixed with with the resulting surface modified silica filler to provide a polydimethylsiloxane-silica powdered concentrate having 32 weight percent silica filler. A foundation mixture (referred to herein as FM) was then prepared by massing the powdered concentrate and gradually adding more Polymer A to provide 12 weight percent silica filler. A one package room temperature vulcanizing silicone sealant was prepared by mixing 95 parts of FM with 5 parts of a crosslinker mixture of 99.5 weight percent which was 44 weight percent methyltriacetoxy-silane, 49 weight percent ethyltriacetoxy-silane, and 7 weight percent impurities and 0.5 weight percent of dibutyltin diacetate.

Slump values were determined using ASTM D 2202 procedure. The extrusion rates were determined by using ASTM C 603 except that the test sealant was extruded through a nozzle with a 0.3175 cm orifice at a pressure of 620.5 kPa. The skin-over-time (SOT) in minutes was determined by spreading out a sample of the sealant composition, about 0.20 to 0.23 cm thick, the surface of the sample was touched lightly with a finger to determine if a skin had formed on the sample's surface. The SOT was the time period in minutes from the sample's initial layout until the finger could be touched lightly to the surface of the sample without sealant composition adhering to the finger. The tack-free-time (TFT) in minutes was determined by ASTM C 679 procedure. The plateau stress was determined as defined hereinbefore.

After eight days storage in a container which sealed the sealant composition from atmospheric moisture, the following properties were determined:
Plateau stress of FM=1315 dynes/cm$^2$
Extrusion rate=296 g/min
Slump=<0.254 cm in 10 min
SOT=7 min
TFT=14 min

EXAMPLE 2

A foundation mixture was prepared by mixing at room temperature 0.26 part of an alpha, omega-dimethoxy (octamethyltetrasiloxane) as the surface modifying agent per 1 part of a reinforcing fumed silica filler having a BET surface area of 200 m$^2$/g. After the surface active agent and silica filler were mixed, the mixture was heated to 95° C. for 30 minutes to obtain a surface modified silica filler. Enough Polymer A was mixed with with the resulting surface modified silica filler to provide a polydimethylsiloxane-silica powdered concentrate having 32 weight percent silica filler. A foundation mixture (referred to herein as FM) was then prepared by massing the powdered concentrate and gradually adding more Polymer A to provide 12 weight percent silica filler. A one package room temperature vulcanizing silicone sealant was prepared by mixing 92.6 parts of FM with 3.12 parts of a ketoximosilane mixture of about 70 weight percent methyltri(methyl ethyl ketoximo) silane, 24 weight percent of methyldi(methyl ethyl ketoximo) silane, 0.5 weight percent methyldimethoxy(methyl ethyl ketoximo)silane, and 5.5 weight percent impurities, 1.51 parts of N-beta-aminoethyl-gamma-aminopropyltrimethoxysilane, 1.85 parts of methyl ethyl ketoxime, 0.79 part of tetraethyl orthosilicate, and 0.15 part of dibutyltin dilaurate. The plateau stress, the slump, the extrusion rate, the SOT, and the TFT were determined as defined in Example 1.

After eight days storage in a container which sealed the sealant composition from atmospheric moisture, the following properties were determined:
Plateau stress of the FM=4200 dynes/cm$^2$
Extrusion rate=290 g/min
Slump=<0.127 cm in 3 min and 0.127 cm in 10 min
SOT=3 min
TFT=9 min That which is claimed is:

1. A process for making a polydiorganosiloxane-silica foundation mixture from a free-flowing, powdered, surface-modified, reinforcing silica-polydiorganosiloxane concentrate comprising (i) combining, while mixing and heating, reinforcing silica filler having a surface area of 90 to 500 m$^2$/g and having a median aggregate-agglomerate particle size less than 600 micrometers, and a surface modifying agent of the formula R'O(R$_2$SiO)$_x$R' wherein R is methyl, ethyl, vinyl, 3,3,3-trifluoropropyl, or phenyl; each R' is selected from the group consisting of methyl radical, ethyl radical, and acetyl radical; and x is a value of from 2 to 12 inclusive, making a filler mixture where there is 0.1 to 0.5 part by weight of surface modifying agent per one part by weight of silica filler, (ii) mixing the filler mixture at a temperature in the range of from >90° C. to <180° C. and maintaining the filler mixture in a fluidized powder state until the surface modifying agent is dispersed throughout the silica filler and the median aggregate-agglomerate particle size of the filler mixture is less than the median aggregate-agglomerate particle size of the silica filler, this mixing process does not exceed 30 minutes in duration, and removing volatiles from the filler mixture during the mixing process where a modified silica filler is obtained, (iii) adding gradually, with mixing, a polydiorganosiloxane having a viscosity measured at 25° C. of from 0.1 to 400 Pa.s to the modified silica filler obtained from step (ii) and completing the addition in <10 minutes after the modified silica filler is obtained at the conclusion of step (ii), where the amount of polydiorganosiloxane is added to provide from 25 to 40 weight percent silica filler based on the total weight of the polydiorganosiloxane and the modified silica filler, thereafter (iv) mixing until a uniform free flowing powder of a reinforcing silica-polydiorganosiloxane concentrate is obtained where the total mixing time of steps of (iii) and (iv) does not exceed 10 minutes, thereafter (v) massing the uniform free-flowing silica-polydiorganosiloxane concentrate obtained from step (iv) until a paste consistency mixture is obtained, and (vi) admixing gradually more polydiorganosiloxane making a uniform foundation mixture having a higher concentration of polydiorganosiloxane than the free-flowing silica-polydiorganosiloxane concentrate and the silica filler content of the uniform foundation mixture is from 8 to 20 weight percent based on the total weight of the foundation mixture.

2. The process according to claim 1 in which the silica filler content of the foundation mixture of step (vi) is from 8 to 15 weight percent based on the total weight of the foundation mixture.

3. The process according to claim 2 in which the surface modifying agent is a mixture of molecules in which at least 50 percent of the molecules have x values of no more than 6.

4. The process according to claim 2 in which the polydiorganosiloxane in step (iii) is added incrementally to the modified silica filler of step (ii).

5. The process according to claim 3 in which the polydiorganosiloxane in step (iii) is added incrementally to the modified silica filler of step (ii).

6. A foundation mixture obtained from the process of claim 2 which has a plateau stress of >700 dynes/cm$^2$ and a shear-thinned viscosity of no more than 1,000 Pa.s at a shear stress of 50,000 dynes/cm$^2$ and the plateau stress and shear-thinned viscosity are measured at 25° C.

7. A foundation mixture obtained from the process of claim 2 which has a plateau stress of >1000 dynes/cm$^2$ and a shear-thinned viscosity of no more than 600 Pa.s at a shear stress of 50,000 dynes/cm$^2$ and the plateau stress and shear-thinned viscosity are measured at 25° C.

8. A foundation mixture obtained from the process of claim 3 which has a plateau stress of >700 dynes/cm$^2$ and a shear-thinned viscosity of no more than 1,000 Pa.s at a shear stress of 50,000 dynes/cm$^2$ and the plateau stress and shear-thinned viscosity are measured at 25° C.

9. A foundation mixture obtained from the process of claim 3 which has a plateau stress of >1000 dynes/cm$^2$ and a shear-thinned viscosity of no more than 600 Pa.s at a shear stress of 50,000 dynes/cm$^2$ and the plateau stress and shear-thinned viscosity are measured at 25° C.

10. A process for making polydiorganosiloxane-silica foundation mixture from a free-flowing, powdered, surface-modified, reinforcing silica-polydiorganosiloxane concentrate comprising (a) heating reinforcing silica filler having a surface area of 90 to 500 m$^2$/g and having a median aggregate-agglomerate particle size less than 600 micrometers to a temperature in a range of from >90° C. to <180° C., removing volatiles from the silica filler, thereafter (b) adding to the heated reinforcing silica filler while mixing, a surface modifying agent of the formula R'O(R$_2$SiO)$_x$R' wherein R is methyl, ethyl, vinyl, 3,3,3-trifluoropropyl, or phenyl; each R' is selected from the group consisting of methyl radical, ethyl radical, acetyl radical; and x is a value of from 2 to 12 inclusive, making a filler mixture where there is 0.1 to 0.5 part by weight of surface modifying agent per one part by weight of silica filler, and (c) heating and mixing the filler mixture at a temperature in the range of from >90° C. to <180° C. and maintaining the filler mixture in a fluidized state until the surface modifying agent is dispersed throughout the silica filler and the median aggregate-agglomerate particle size of the filler mixture is less than the median aggregate-agglomerate particle size of the silica filler, the mixing process does not exceed 30 minutes in duration, and removing volatiles from the filler mixture during the mixing process where a modified silica filler is obtained, (d) adding gradually, with mixing, a polydiorganosiloxane having a viscosity measured at 25° C. of from 0.1 to 400 Pa.s to the modified silica filler of step (c) and completing the addition in <10 minutes after the modified silica filler is obtained at the conclusion of step (c), where the amount of polydiorganosiloxane is added to provide from 25 to 40 weight percent silica filler based on the total weight of the polydiorganosiloxane and the modified silica filler, thereafter (e) mixing until a uniform, free-flowing, powdered, surface-modified, reinforcing silica-polydiorganosiloxane concentrate is obtained where the total mixing time of steps (d) and (e) does not exceed 10 minutes, thereafter (f) massing the uniform free-flowing silica-polydiorganosiloxane concentrate obtained from step (e) until a paste consistency mixture is obtained, and thereafter (g) admixing gradually more polydiorganosiloxane making a uniform foundation mixture having a higher concentration of polydiorganosiloxane than the uniform free-flowing silica-polydiorganosiloxane concentrate obtained in step (e) and the silica filler content of the foundation mixture is from 8 to 20 weight percent based on the total weight of the foundation mixture.

11. The process according to claim 10 in which the silica filler content of the foundation mixture of step (g) is from 8 to 15 weight percent based on the total weight of the foundation mixture.

12. The process according to claim 11 in which the surface modifying agent is a mixture of molecules in which at least 50 percent of the molecules have x values of no more than 6.

13. The process according to claim 11 in which the polydiorganosiloxane in step (d) is added incrementally to the modified silica filler of step (c).

14. The process according to claim 12 in which the polydiorganosiloxane in step (d) is added incrementally to the modified silica filler of step (c).

15. A foundation mixture obtained from the process of claim 11 which has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

16. A foundation mixture obtained from the process of claim 11 which has a plateau stress of >1000 dynes/cm$^2$ and a shear-thinned viscosity of no more than 600 Pa.s at a shear stress of 50,000 dynes/cm$^2$ and the plateau stress and the shear-thinned viscosity are measured at 25° C.

17. A foundation mixture obtained from the process of claim 12 which has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

18. A foundation mixture obtained from the process of claim 12 which has a plateau stress of >1000 dynes/cm$^2$ and a shear-thinned viscosity of no more than 600 Pa.s at a shear stress of 50,000 dynes/cm$^2$ and the plateau stress and the shear-thinned viscosity are measured at 25° C.

19. A room temperature vulcanizable silicone sealant composition comprising the foundation mixture according to claim 6 and further comprising a moisture hydrolyzable crosslinking silicone compound.

20. A room temperature vulcanizable silicone sealant composition comprising the foundation mixture according to claim 7 and further comprising a moisture hydrolyzable crosslinking silicone compound.

21. A room temperature vulcanizable silicone sealant composition comprising the foundation mixture according to claim 8 and further comprising a moisture hydrolyzable crosslinking silicone compound.

22. A room temperature vulcanizable silicone sealant composition comprising the foundation mixture according to claim 9 and further comprising a moisture hydrolyzable crosslinking silicone compound.

23. A room temperature vulcanizable silicone sealant composition comprising the foundation mixture according to claim 15 and further comprising a moisture hydrolyzable crosslinking silicone compound.

24. A room temperature vulcanizable silicone sealant composition comprising the mixture according to claim 16 and further comprising a moisture hydrolyzable crosslinking silicone compound.

25. A room temperature vulcanizable silicone sealant composition comprising the foundation mixture according to claim 17 and further comprising a moisture hydrolyzable crosslinking silicone compound.

26. A room temperature vulcanizable silicone sealant composition comprising the foundation mixture according to claim 18 and further comprising a moisture hydrolyzable crosslinking silicone compound.

* * * * *